May 3, 1955
R. M. M. OBERMAN
2,707,726
CONTROL OF A NON-HOMING SWITCH
IN A POTENTIAL-MARKING
TELEPHONE SYSTEM
Filed Feb. 1, 1950
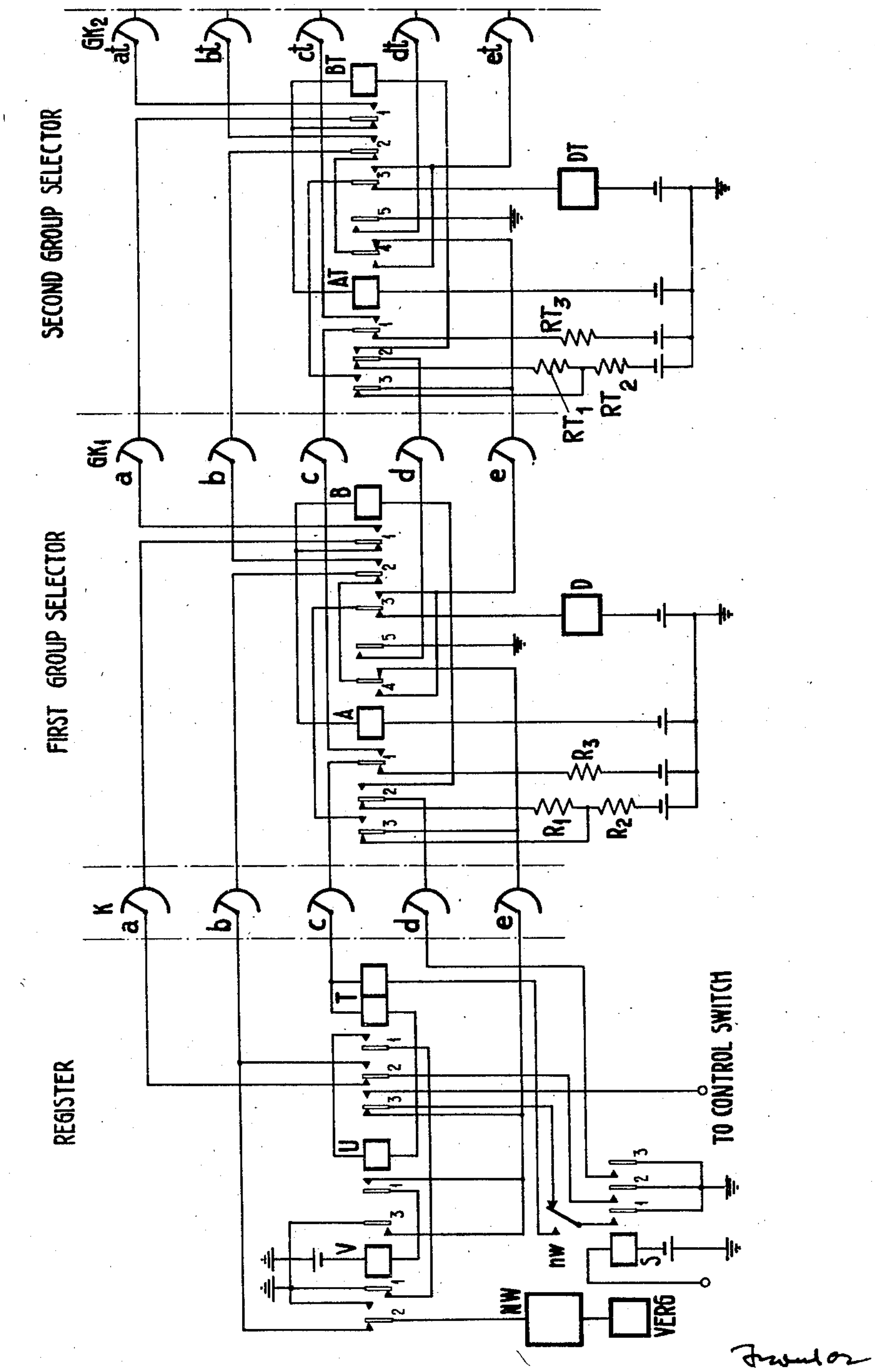
Inventor
Roelof Maarten Marie Oberman
by Michael S. Striker
atty 2,707,726
Patented May 3, 1955

2,707,726

CONTROL OF A NON-HOMING SWITCH IN A POTENTIAL-MARKING TELEPHONE SYSTEM

Roelof Maarten Marie Oberman, The Hague, Netherlands

Application February 1, 1950, Serial No. 141,628

Claims priority, application Netherlands February 7, 1949

15 Claims. (Cl. 179—18)

The present invention relates to new and useful improvements in telecommunication systems, and more particularly to selector and finder controls for such systems.

It is an object of the present invention to control the performance of a selecting operation of said finders and selectors accurately and rapidly.

The copending applications Serial No. 772,406, filed September 5, 1947, now Pat. No. 2,584,153; Serial No. 25,108, filed May 5, 1948, now Pat. No. 2,654,837; and Serial No. 111,394, filed August 20, 1949, now Pat. No. 2,577,147, disclose an electrical comparison circuit comprising at least one high vacuum tube having a test relay in the output anode circuit, the conductive condition of said tube being controlled by applying the potentials which have to be compared to said tube so that the test relay is energized when said potentials are substantially identical. The telecommunication system is such that the outlets of the selectors and finders may be marked by a particular A. C. or D. C. potential whereas the registered code is applied to the comparison circuit as an A. C. or D. C. potential, respectively.

It is usual in telecommunication systems to make a busy test in order to ascertain whether a reached outlet is busy or not, such a test usually being a D. C. test.

It is a further object of the present invention to overcome the drawback that the A. C. or D. C. comparison has to be made twice to ensure against wrong positioning of the selectors which may occur when an outlet of a selector in a seized connection becomes free at the moment when the wipers leave the contacts corresponding to said connection.

A feature of the present invention consists in that the comparison of the registered potential and the potential supplied by the selector or finder and the busy test are carried out in dependence upon each other.

Another feature of the present invention consists in that the selector circuit is only switched through when a desired contact is reached which is not busy, whereas a second test is made in order to find out whether the free condition really does exist and is not due to some other reason.

Still another feature of the present invention consists in that, as soon as a free outlet is reached which is desired, the marking potential of the outlet is altered in such a way that no other comparison circuit will respond to it.

A further feature of the present invention consists in that the busy condition is immediately applied to the selector or finder outlet so that no other selector or finder will find the relevant outlet free.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

The only figure diagrammatically shows an automatic telephone system register and a selector controlled thereby.

The part of the register of the arrangement shown at the left hand side of the drawing contains an electronic voltage comparison device NW known as a zero switch. The zero switch can compare two A.C. quantities or D. C. quantities so that the contact *nw* is changed over from the position shown only if the comparison voltage applied to the zero switch and the voltage to be tested are substantially equal. A digit number corresponding to the selector is applied as a D. C. potential characteristic to the comparison circuit by means of a box marked "Verg." This is more fully described in the "Bridge Marker Key Automatic System." "Verg" gives the right comparison voltage, which voltage depends on the position of the successive selector stages.

The drawing further shows a start relay S in the register which when energized starts the operation for selecting the desired connection. A cord finder K is shown which is positioned at the shown outlet since it is assumed that the calling subscriber is allotted to the register. This outlet of the cord finder has access to the first group selector $GK_1$ which has to be positioned. It is now assumed that the shown outlet of the group selector is the first free outlet of the desired group, said outlet having access to the second group selector $GK_2$.

The selectors are shown having five contact banks and associated wipers. The banks and wipers of the first group selector are denoted by the reference letters *a–e*, whereas the corresponding banks and wipers of the second group selector are denoted by *at—et*. The selectors have associated circuits comprising a seizing or preparatory relay A, and AT, respectively, and a switching-through relay B and BT, respectively. The characteristic potential for a group is supplied by potentiometers consisting of the resistors $R_1/R_2$ and $RT_1/RT_2$, respectively, while the busy condition is indicated by the resistor $R_3$ and $RT_3$, respectively, having such a resistance value that only one of the relays such as T in the different registers can respond to the current passing said resistor. The relay T comprises two windings, a high resistance test winding and a low resistance holding winding. In series with the holding winding of relay T an auxiliary relay U is connected which closes a circuit upon energization for testing the seized selector circuit which test is performed by the relay V.

The selector control of the arrangement according to the invention is such that the selector to be positioned wipes a series of potentials which are supplied by marking potentiometers of which only the potentiometer $R_1/R_2$ is shown as it is characteristic for the shown outlet. The marking potentials supplied by the potentiometer are transferred over the wiped contact in the bank *e* to the conductor *b* which is connected over the preceding selectors, if any, and the wiper *b* of the cord finder to the comparison circuit in the register. This control circuit runs from the potentiometer over contact 3 of relay AT, the wiped contact in the bank *e* of the selector, for instance $GK_1$, the off normal contact 4 of relay A, contact 2 of relay B, wiper *b* of the positioned cord finder K, contact 2 of relay V to the comparison circuit NW. The selector wipers are moved through the contact banks by means of the driving magnet D, which is energized in a circuit for ground at the closed contact 1 of the start relay S, the contact *nw* which is operated by the test relay (not shown) of the comparison circuit, contact 3 of the busy test relay T, the positioned wiper *e* of the cord finder K, off normal contact 3 of relay A, contact 3 of the switching-through relay B, driving magnet D to battery and ground. This circuit is interrupted by the contact *nw*, which then closes the circuit for the busy test relay T upon energization of which the marking potential of the potentiometer is disturbed by the application of full ground to the control circuit so that no other comparison circuit can respond to the potential on its control circuit as full ground will be found.

From the above it is evident that the potentiometer $R_1/R_2$ belonging to the first group selector circuit is disconnected from the conductor *e* by means of a contact 3 of the seizing relay A. Since after the positioning of a selector, the marking potential is no longer needed, and since the current flowing in the potentiometer may only damage the precision resistors thereof without there being any necessity for it, the circuit comprising said resistors is interrupted at contact 2 of said relay A.

The seizing relay A is operated when contact 2 of the start relay S is closed, in a circuit from ground at contact 2 of the relay S over contact 2 of relay T, the bank *a* of the positioned cord finder K, contact 1 of the switching-through relay B, the winding of relay A, battery to ground. Contact 5 of the relay A prepared to a circuit for the potentiometer $RT_1/RT_2$ to be tested in the following stage.

A similar circuit is disclosed in the copending application Serial No. 767,528, filed July 30, 1947. In this application the marking potential occurring at the conductor *e* is disturbed by connecting the conductor *e* to ground over a low resistance which takes place when the switching-through of the selector circuit occurs. On the other hand, however, the driving magnet in the copending application is connected to ground which is objectionable as the register in such a case has to supply a negative potential over a low resistance to operate said driving magnet, so that dangerous complications are involved as the driving magnet is stopped as soon as a conductor *e* is reached on which a ground potential occurs. This might be prevented by changing the potentials occurring at the driving magnet and in the register. However, this does not shorten the period of time in which the precision resistor corresponding to the resistor $R_1$ of the present application has to conduct the disturbing ground potential applied to said resistor so that the resistor may easily be damaged. In the present invention the switching through period is shortened by the application of the busy test relay which performs the switching through by means of the contact 2.

The operation of the circuit according to the present invention is as follows:

Relay S in the register is energized in a circuit controlled by a control or sequence switch (not shown), the stepping circuit of said switch being indicated as far as necessary for understanding how said sequence switch is stepped to the next position thereof. Relay S thus closes the contacts 1, 2 and 3 thereof. By means of contact 2 a circuit is made for the seizing relay A of the selector circuit so that said relay is energized, the circuit including ground at contact 2 of relay S, contact 2 of the busy test relay T, the bank *a* of the positioned cord finder K and group selectors, if any (not shown), contact 1 of the switching through relay B, the winding of the seizing relay A, battery and ground. The relay A switches over the armature 1 thereof thereby connecting the test conductor connected to bank *c* of the cord finder K to the next selector circuit, so that the test relay may test the busy condition of an outlet in a circuit including ground, contact 1 of the start relay S in the register, contact *nw* operated by the comparison circuit NW, the high resistance winding of the test relay T, bank *c* of the positioned cord finder K and group selectors, if any (not shown), off normal contact 1 of relay A, wiper *c* of the selector $GK_1$, the contact 1 of the relay AT, a resistor $RT_3$, having a large resistance battery. The contacts 2 and 3 of relay A disconnect the potentiometer $R_1/R_2$ by means of which the preceding selector was positioned. By means of the contact 4 of the relay A the control circuit is completed for transferring the potentials which are characteristic for the outlets of the selector $GK_1$.

The selector $GK_1$ is started by the application of ground in the register to the conductor connected to wiper *e* of the cord finder K owing to which the driving magnet D starts rotating the wipers of selector $GK_1$ through the associated contact banks, the circuit for the driving magnet running from ground in the register over contact 1 of the relay S, contact *nw*, contact 3 of the test relay T, the positioned wiper *e* and its associated contact bank of the cord finder K, off normal contact 3 of the relay A, contact 3 of relay B, the driving magnet D to battery and ground. The selector $GK_1$ now wipes the marking potentials applied to the wiper *e* of selector $GK_1$ by the potentiometer $RT_1/RT_2$ which is connected in a circuit including the now closed contact 5 of relay A.

The comparison circuit NW now receives the potentials which are characteristic for the selector $GK_2$.

When the wiper *et* wipes a contact in the associated contact bank having a potential which is substantially identical to the one supplied by the arrangement VERG indicating a desired outlet, the test relay (not shown) in the comparison circuit NW will operate and attract the armature *nw*. When the armature *nw* is moved over the energization circuit for the driving magnet is interrupted so that the latter stops on the contact on which the identical potential occurs. On the other hand the armature *nw* now closes a circuit for the busy test relay T as more fully described hereinabove. The relay T now responds to the current supplied over the resistor $R_3$.

The resistor $R_3$, however, has a large resistance and when two selectors would reach the outlet at the same time the high ohmic test windings of the two relays T associated with said selectors cannot operate both with the supplied current. In such a case it is highly unlikely that both the relays are switched in at exactly the same moment and that the resistance and the ampere windings of the test relays are exactly equal so that an unstable balance condition could result.

The busy test relay connected to a free outlet having the desired characteristic potential operates and closes a circuit for the holding winding thereof running from ground at contact 1 of relay V, the off normal contact 1 of relay T, winding of the auxiliary relay U, the holding winding of relay T to the wiper *c* of the cord finder K, this circuit being parallel to the circuit energizing the busy test relay T. The holding winding of relay T has a low resistance so that a possible response of another busy test relay is eliminated. By means of contact 2 of the relay T the operating circuit for the relay A is interrupted, whereas said contact applies ground to the control circuit thereby disturbing the marking potential at the wiper *e* and the conductive condition of the comparison circuit NW so that contact *nw* is returned to the initial position thereof.

The release of armature *nw* closes a circuit for the sequence switch from ground at contact 1 of relay S over the released contact *nw* and the off normal contact 3 of the test relay T to the stepping circuit of the sequence switch which will step to the next position thereof upon the release of contact 3 of relay T.

Between the stopping of the selector and the busy test a short time elapses before the relay T attracts the armatures thereof, this period of time being necessary for allowing the selector to stop at the proper outlet since otherwise it is possible that the selector is just released when the wiper is due to leave the contact so that it will really be stopped in front of the next contact in the bank which might be a not desired outlet. In such a case the comparison circuit switches the contact *nw* back, thus applying ground to the driving magnet so that the selector once more starts rotating through the contact banks for finding another or the same outlet since the selectors are of the continuous hunting type. Relay T on the other hand signifies by the operation thereof that the positioning of the relevant selector is ended and that the selector is set on a desired outlet.

When it has been ascertained in this way that the selector is positioned the selector circuit can be switched through which occurs owing to the interruption of the energization circuit for the seizing relay A at the contact 2 of the test relay T. Relay A, however, by means of the contact 2 thereof, has closed a holding circuit in series with the switching through relay B so that upon the interruption of the circuit by contact 2 of relay T ground is supplied over the winding of the switching through relay B, the circuit running from ground in the register over contact 3 of relay S, the wiper *d* and the associated contact bank of the positioned cord finder K, off normal contact 2 of relay A, the winding of the relay B, the winding of the relay A to negative battery terminal. The switching through relay is then energized in series with relay A.

The switching through of the selector circuit is effected at the conductors connected with wipers and contact banks *a* and *b* which are the speech conductors in a telephone system or the signalling wires in a telegraph system, and at the conductors connected to the wipers and the contact banks *e*. By means of the contact 1 of relay B a circuit is prepared for the energization of the seizing relay AT in the next selector circuit which is only completed when the relay T is de-energized. The contact 2 of relay B closes a circuit for altering the marking potential so that no other comparison circuit can respond to this potential, while interrupting the original circuit for altering said marking potential. This last switching over has the additional effect that the disturbing potential will not act a long time on the resistor $R_2$. The new circuit runs from ground in the register over contact 2 of the start relay S, the off normal contact 2 of relay T, the wiper and associated bank *b* of the cord finder K, the off normal contact 2 of relay B, the wiper *b* of the just positioned selector $GK_1$, contact 2 of the switching through relay BT, contact 4 of relay AT, to the contact of the contact bank *e* on which the selector $GK_1$ is positioned, this effecting again such a change in the marking potential that the selector cannot be taken by another preceding selector of the multiple. It is possible that another selector will stop on the outlet during the switching over the armature 2 of the switching through relay B. This chance is, however, limited since the switching over requires only a few milliseconds, on the other hand it is impossible that the selector can test this outlet as a free one since the busy test relay which will then test the outlet can never respond as the test conductor is connected over the low resistance winding of the shown busy test relay T. Thus the selector will immediately start rotating again when the off normal contact of contact 2 of relay B is reached, since the marking potential will then be altered. The chance of such a stopping is diminished by the response of the comparison circuit which has to release its armature *nw* which, even if the controlling relay very quickly releases requires some time.

The contact 3 of relay B disconnects the released driving magnet D from the original circuit so that this magnet cannot operate again in the seized circuit. On the other hand said contact connects the conductor associated with wiper and contact bank *e* to the register, the circuit running from the register over the wiper *e* of the cord finder K, off normal contact 3 of relay A, off normal contact 3 of relay B, to the wiper and associated contact bank *e* of the selector $GK_1$.

In the register the auxiliary relay U closes the contact 1 thereof, thus completing a circuit for the test relay V which tests the seized circuit for ascertaining whether this circuit is really free. The relay V is also adapted for releasing the busy test relay T, thus initiating the next selecting operation. The circuit in which relay V is energized runs from ground in the register at the closed contact 2 of the start relay S over contact 2 of the busy test relay T, wiper and contact bank *b* of the cord finder K, contact 2 of relay B, wiper and contact bank *b* of the selector $GK_1$, contact 2 of the relay BT, contact 4 of the relay AT, wiper and contact bank *e* of the selector $GK_1$ contact 3 of relay B, contact 3 of relay A, wiper and contact bank *e* of the cord finder K, contact 1 of the auxiliary relay U, winding of the relay V, to the negative battery terminal.

The relay V closes a holding circuit for itself by means of the contact 3 thereof, the circuit leading from ground over contact 3 of relay V, contact 1 of the auxiliary relay U, winding of relay V, to negative battery terminal. By means of the contact 2 of the relay V the control circuit to the comparison circuit NW is interrupted and connected to ground. By means of contact 1 the holding circuit of the relays U and T is interrupted so that the said relays release the armatures thereof.

Relay T opens now the contact 1 thereof being inserted in the just released holding circuit so that when relay V releases the armature thereof the holding circuit cannot be operated before the winding of relay T is energized. Contact 2 of relay T disconnects the ground which it carries from the control circuit from the conductor connected to wiper *b* of cord finder K and over its normal contact connects ground to the conductor connected to wiper *a* in the register to which the relay AT in the seized selector circuit responds. Relay U breaks the holding circuit of the relay V at the same time when relay T releases the armatures threof, whereas relay T by means of the contact 3 thereof ends the impulse to the sequence switch so that the latter will step to its next position, in which the following registered digit is applied to the comparison circuit as a characteristic potential. It should be remarked that the disturbing ground potential on the control circuit is not removed at the time contact 2 of relay T is switched to the normal condition thereof since the holding circuit of relay V applies also ground to the potentiometer $RT_1/RT_2$.

By means of contact 3 of relay AT, which is now operated, switches off the marking potential from the potentiometer $RT_1RT_2$ since the marking potential is no longer needed. The contact 3 of relay AT prepares in the off normal position thereof a circuit for the driving magnet DT of the selector $GK_2$. By means of the contact 2 of the relay AT, current consumption of the marking potentiometer $RT_1/RT_2$ is interrupted, whereas said contact in its off normal position prepares a holding circuit for relay AT in series with switching through relay BT, the operation of which corresponds to the described operation of the corresponding relays A and B. The off normal contact 4 of the relay AT connects the control circuit to the wiper *e* of selector $GK_2$, while contact 5 of said relay AT prepares a circuit for the potentiometers (not shown) of the following stage, thereby switching the busy test circuit to the next selector circuit.

The relay V releases upon interruption of the holding circuit thereof the armatures thereof so that the comparison circuit NW is again connected to the control circuit by means of the contact 2 of relay V, while contact 3 removes the ground potential from the conductor connected to wiper *e* of the cord finder K.

The driving magnet DT of the selector $GK_2$ is now energized in the circuit from ground at contact 1 of the start relays, over contact *nw*, contact 3 of the busy test relay T, wiper and associated contact bank *e* of the cord finder K, off normal contact 3 of relay A, off normal contact 3 of relay B, wiper and contact bank *e* of the selector $GK_1$, off normal contact 3 of relay AT, contact 3 of relay BT, driving magnet DT, to negative battery terminal. A new selecting motion now begins in the selector $GK_2$ which is now to be positioned.

It will be clear from the foregoing description of the invention that this arrangement is applicable to both homing and non-homing selectors, but that the arrangement is particularly useful in systems applying selectors of the latter type.

As it is desirable not to remove the disturbing ground potential from the control circuit some modifications of the invention may be made, for instance the contacts 2 of the switching through relays B and BT may be of the make before break type so that the disturbing ground is not removed during the switching through by said relays. It is also possible to incorporate the auxiliary relay U in the busy test relay T if said last relay can operate all the contacts.

It will be understood that each of the elements described above, or two or more together, may also find a useful application in other types of telecommunication systems differing from the types described above.

While the invention has been illustrated and described as embodied in a selector and finder control for telecommunication systems, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a telecommunication system, in combination, a register for registering potentials corresponding to digits; a selector having a plurality of contact banks, each of said contact banks having respectively a wiper and a plurality of outlets; means for positioning said selector by said register so that said selector establishes a connection with one of said outlets of each contact bank at a time; means for marking the outlets of a first of said contact banks by different potentials respectively; means arranged in said register for comparing the potentials applied to said outlet with one of the potentials corresponding to a digit; means arranged in said register for testing the busy condition of said outlets of said selector; and switch means having a predetermined potential, said switch means being controlled by said testing means for connecting said predetermined potential to a selected one of said marked outlets of said selector, via a contact bank other than that at the outlets of which said marking potentials are applied, so that no other means for comparing potentials can respond to said predetermined potential connected to said outlet.

2. In a telecommunication system, in combination, a register for registering potentials corresponding to digits; a selector having a plurality of contact banks, each of said contact banks having respectively a wiper and a plurality of outlets; means for positioning said selector by said register so that said selector establishes a connection with one of said outlets of each of said contact banks at a time; means for marking the outlets of a first of said contact banks by different potentials, respectively; means arranged in said register for comparing the potentials applied to said outlets with one of the potentials corresponding to a digit; means arranged in said register for testing the busy condition of said outlets of said selector; switch means having a predetermined potential, said switch means being controlled by said testing means for connecting said predetermined potential to one of said marked outlets of said first contact bank of said selector, said predetermined potential being connected through a contact bank other than said first contact bank to prevent any other means for comparing potentials located in another register from responding to said predetermined potential connected to said outlet; and a seizing relay forming part of a circuit of said selector and having armatures controlling contacts controlling the current supply to and from said marking means and the connection of said testing means.

3. In a telecommunication system, in combination, a register for registering potentials corresponding to digits; a selector having a plurality of contact banks, each of said contact banks having respectively a wiper and a plurality of outlets; means for positioning said selector by said register so that said selector establishes a connection with one of said outlets of each of said contact banks at a time; means for marking the outlets of a first of said contact banks by different potentials, respectively; means arranged in said register for comparing the potentials applied to said outlets with one of the potentials corresponding to a digit; means arranged in said register for testing the busy condition of said outlets of said selector; switch means having a predetermined potential, said switch means being controlled by said testing means for connecting said predetermined potential to one of said marked outlets of said first contact bank of said selector, said predetermined potential being connected through a contact bank other than said first contact bank to prevent any other means for comparing potentials located in another register from responding to said predetermined potential connected to said outlet; a seizing relay forming part of a circuit of said selector and having armatures controlling contacts controlling the current supply to and from said marking means and the connection of said testing means; and a relay for switching through the connection to said selector, said switching-through relay being energized by one of said armatures of said seizing relay in off normal position thereof.

4. In a telecommunication system, in combination, a register for registering potentials corresponding to digits; a selector having a plurality of contact banks and wipers associated therewith, said selector having a plurality of outlets; means for positioning said selector by said register so that said selector establishes a connection with one of said outlets at a time; means for marking said outlets over the first of said contact banks by different potentials, respectively; means arranged in said register for comparing the potentials applied to said outlets with one of the potentials corresponding to a digit, the second of said contact banks serving for indicating the busy condition of said outlets; means arranged in said register for testing the busy condition of said outlets of said selector; and switch means having a predetermined potential, said switch means being controlled by said testing means for connecting said predetermined potential to said outlets of said selector so that no other means for comparing potentials located in another register can respond to said predetermined potential connected to said outlets.

5. In a telecommunication system, in combination, a register for registering potentials corresponding to digits numbers; a selector having a plurality of contact banks and wipers associated therewith, said selector having a plurality of outlets; means for positioning said selector by said register so that said selector establishes a connection with one of said outlets at a time; means for marking said outlets over the first of said contact banks by different potentials, respectively; means arranged in said register for comparing the potentials applied to said outlets with one of the potentials corresponding to a digit, the second of said contact banks serving for indicating the busy condition of said outlets; means arranged in said register for testing the busy condition of said outlets of said selector; and switch means having a predetermined potential, said switch means being controlled by said testing means for connecting said predetermined potential to said outlets of said selector so that no other means for comparing potentials located in another register can respond to said predetermined potential connected to said outlets; a seizing relay forming part of said selector and having armatures controlling contacts controlling the current supply to and from said marking means and the connection of said testing means; and a relay for switching through the connection to said selector, said switching-through relay being energized by one of said armatures of said seizing relay in off-normal position thereof, said testing means being operated over a third of said contact banks and operating said switching-through relay.

6. In a telecommunication system, in combination, a register for registering potentials corresponding to digits; a selector having a plurality of contact banks and wipers associated therewith, said selector having a plurality of outlets; means for positioning said selector by said register so that said selector establishes a connection with one of said outlets at a time; means for marking said outlets over the first of said contact banks by different direct current potentials, respectively; means arranged in said register for comparing the direct current potentials applied to said outlets with one of the potentials corresponding to a digit, the second of said contact banks serving for indicating the busy condition of said outlets; means arranged in said register for testing the busy condition of said outlets of said selector; switch means having a predetermined potential, said switch means being controlled by said testing means for connecting said predetermined potential to said outlets of said selector so that no other means for comparing potentials located in another register can respond to said predetermined potential connected to said outlets; a seizing relay forming part of said selector and having armatures controlling contacts controlling the current supply to and from said marking means and the connection of said testing means; and a relay for switching through the connection to said selector, said switching-through relay being energized by one of said armatures of said seizing relay in off-normal position thereof, said testing means being operated over a third of said contact banks and operating said switching-through relay.

7. In a telephone communication system, in combination, a register for registering potentials corresponding to digits; a selector having a plurality of outlets; means for positioning said selector by said register so that said selector establishes a connection with one of said outlets at a time; means for marking said outlets by different potentials, respectively; means arranged in said register for comparing the potentials applied to said outlets with one of the potentials corresponding to a digit; and means arranged in said register for testing the busy condition of said outlets of said selector, said means being energized when said comparing means compares potentials which are substantially equal.

8. In a telephone communication system, in combination, a register for registering potentials corresponding to digits; a selector having a plurality of outlets; means for positioning said selector by said register so that said selector establishes a connection with one of said outlets at a time; means for marking said outlets by different potentials, respectively; means arranged in said register for comparing the potentials applied to said outlets with one of the potentials corresponding to a digit; means arranged in said register for testing the busy condition of said outlets of said selector, said means being energized when said comparing means compares potentials which are substantially equal; and switch means electrically connected to ground potential, said switch means being controlled by said testing means for connecting said predetermined ground potential to said outlets of said selector so that no other means for comparing potentials will respond to said ground potential connected to said outlets.

9. In a telecommunication system, in combination, a register for registering potentials corresponding to digits;

a selector having a plurality of outlets; means for positioning said selector by said register so that said selector establishes a connection with one of said outlets at a time; means for marking said outlets by different potentials, respectively; means arranged in said register for comparing the potentials applied to said outlets with one of the potentials corresponding to a digit; means arranged in said register for testing the busy condition of said outlets of said selector; switch means electrically connected to ground potential, said switch means being controlled by said testing means for connecting said predetermined ground potential to said outlets of said selector so that no other means for comparing potentials will respond to said ground potential connected to said outlets; and a seizing relay forming part of the circuit of said selector and having armatures controlling contacts controlling the current supply to and from said marking means and the connection of said testing means.

10. In a telecommunication system, in combination, a register for registering potentials corresponding to digits; a selector having a plurality of outlets; means for positioning said selector by said register so that said selector establishes a connection with one of said outlets at a time; means for marking said outlets by different potentials, respectively; means arranged in said register for comparing the potentials applied to said outlets with one of the potentials corresponding to a digit; means arranged in said register for testing the busy condition of said outlets of said selector; and a seizing relay forming part of the circuit of said selector and having armatures controlling contacts controlling the current supply to and from said marking means and the connection of said testing means.

11. In a telecommunication system, in combination, a register for registering potentials corresponding to digits; a selector having a plurality of outlets; means for positioning said selector by said register so that said selector establishes a connection with one of said outlets at a time; means for marking said outlets by different potentials, respectively; means arranged in said register for testing the busy condition of said outlets of said selector; means arranged in said register for energizing said positioning means and preparing the operating circuit of said testing means; and switch means having a predetermined potential connected thereto, said switch means being controlled by said testing means for connecting said predetermined potential to said outlets of said selector so that no other means for comparing potentials can respond to said predetermined potential connected to said outlets.

12. In a telecommunication system, in combination, a register for registering potentials corresponding to digits; a selector having a plurality of outlets; means for positioning said selector by said register so that said selector establishes a connection with one of said outlets at a time; means for making said outlets by different potentials, respectively; means arranged in said register for comparing the potentials applied to said outlets with one of the potentials corresponding to a digit; means arranged in said register for testing the busy condition of said outlets of said selector; means arranged in said register for energizing said positioning means and preparing the operating circuit of said testing means; switch means having a predetermined potential connected thereto, said switch means being controlled by said testing means for connecting said predetermined potential to said outlets of said selector so that no other means for comparing potentials located in another register can respond to said predetermined potential connected to said outlets; and a seizing relay forming part of the circuit of said selector and having armatures controlling contacts controlling the current supply to and from said marking means and the connection of said testing means.

13. In a telecommunication system, in combination, a register for registering potentials corresponding to digits; a selector having a plurality of outlets; means for positioning said selector by said register so that said selector establishes a connection with one of said outlets at a time; means for marking said outlets by different potentials, respectively; means arranged in said register for comparing the potentials applied to said outlets with one of the potentials corresponding to a digit; means arranged in said register for testing the busy condition of said outlets of said selector; means arranged in said register for energizing said positioning means and preparing the operating circuit of said testing means; switch means having a predetermined potential connected thereto, said switch means being controlled by said testing means for connecting said predetermined potential to said outlets of said selector so that no other means for comparing potentials located in another register can respond to said predetermined potential connected to said outlets; a seizing relay forming part of the circuit of said selector and having armatures controlling contacts controlling the current supply to and from said marking means and the connection of said testing means; and a relay for switching through the connection of said selector, said switching through relay being energized by one of said armatures of said seizing relay in off-normal position thereof.

14. In a telecommunication system, in combination, a register for registering digits corresponding to predetermined potentials; a selector having a plurality of contact banks and wipers associated therewith, said selector having a plurality of outlets; means for positioning said selector by said register so that said selector establishes a connection with one of said outlets at a time; means for marking said outlets over the first of said contact banks by different potentials, respectively; means arranged in said register for comparing the potentials applied to said outlets with one of the potentials corresponding to a digit, the second of said contact banks serving for indicating the busy condition of said outlets; means arranged in said register for testing the busy condition of said outlets of said selector; means arranged in said register for rendering operative said positioning means and preparing the operating circuit of said testing means; and switch means having a predetermined potential connected thereto, said switch means being controlled by said testing means for connecting said predetermined potential to said outlets of said selector so that no other means for comparing potentials located in another register can respond to said predetermined potential connected to said outlets.

15. In a telecommunication system, in combination, a register for registering digits and for translating said digits into corresponding potentials; a selector having a plurality of contact banks and wipers associated therewith, said selector having a plurality of outlets; means for positioning said selector by said register so that said selector establishes a connection with one of said outlets at a time; means for marking set outlets over the first of said contact banks by different potentials; means arranged in said register for comparing the potentials applied to said outlets with one of the potentials corresponding to a digit, the second of said contact banks serving for indicating the busy condition of said outlets; means arranged in said register for testing the busy condition of said outlets of said selector; means arranged in said register for rendering operative said positioning means and preparing the operating circuit of said testing means; switch means having a predetermined potential connected thereto, said switch means being controlled by said testing means for connecting said predetermined potential to said outlets of said selector so that no other means for comparing potentials located in another register can respond to said predetermined potential connected to said outlets; a seizing relay forming part of said selector and having armatures controlling contacts controlling the current supply to and from said marking means and the connection of said testing means; and a relay for switching through the connection to said selector, said switching through relay being energized by one of said armatures of said seizing relay in off-normal position thereof, said testing means being operated over a third of said contact banks and operating said switching through relay.

References Cited in the file of this patent

UNITED STATES PATENTS 2,380,950 Deakin ---------------- Aug. 7, 1945

FOREIGN PATENTS 592,846 Gerat Britain ----------- Oct. 1, 1947